US010798408B2

United States Patent
Bankoski et al.

(10) Patent No.: US 10,798,408 B2
(45) Date of Patent: *Oct. 6, 2020

(54) LAST FRAME MOTION VECTOR PARTITIONING

(71) Applicant: GOOGLE LLC, Mountain View, CA (US)

(72) Inventors: James Bankoski, Los Gatos, CA (US); Debargha Mukherjee, Cupertino, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,297

(22) Filed: May 9, 2019

(65) Prior Publication Data

US 2019/0268618 A1    Aug. 29, 2019

Related U.S. Application Data

(63) Continuation of application No. 15/011,415, filed on Jan. 29, 2016, now Pat. No. 10,306,258.

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/119* (2014.11);
(Continued)

(58) Field of Classification Search
CPC ..... H04N 19/52; H04N 19/119; H04N 19/176
(Continued)

(56) References Cited

U.S. PATENT DOCUMENTS

| | | |
|---|---|---|
| 5,103,488 A | 4/1992 | Gemello et al. |
| 5,177,608 A | 1/1993 | Ohki et al. |

(Continued)

FOREIGN PATENT DOCUMENTS

| | | |
|---|---|---|
| CN | 102939754 A | 2/2013 |
| CN | 102845062 B | 4/2015 |

(Continued)

OTHER PUBLICATIONS

Bankoski, et al., "Technical Overview of VP8, an Open Source Video Codec for the Web", Jul. 11, 2011, 6 pp.
(Continued)

*Primary Examiner* — Jeremiah C Hallenbeck-Huber
(74) *Attorney, Agent, or Firm* — Young Basile Hanlon & MacFarlane, P.C.

(57) ABSTRACT

A first partitioning for partitioning a first region of a frame before a current frame in a video sequence is determined. The first partitioning defines at least two prediction sub-regions of the first region, and the prediction sub-regions include contiguous, non-overlapping groups of pixels. A motion vector that predicts a prediction sub-region of the first region is determined. The first partitioning is modified to a second partitioning by moving at least one border of the first partitioning that is between adjacent prediction sub-regions of the first region by the motion vector. A current region of the current frame that is collocated with the first region is partitioned by the second partitioning, and is encoded or decoded. The technique eliminates the need to re-partition an entire frame each time, and can be used with both rectangular-shaped block partitioning and partitioning using masks and other partitioning techniques.

20 Claims, 8 Drawing Sheets

(51) Int. Cl.
*H04N 19/176* (2014.01)
*H04N 19/119* (2014.01)
*H04N 19/513* (2014.01)
*H04N 19/136* (2014.01)
*H04N 19/167* (2014.01)
*H04N 19/44* (2014.01)

(52) U.S. Cl.
CPC ......... *H04N 19/136* (2014.11); *H04N 19/167* (2014.11); *H04N 19/176* (2014.11); *H04N 19/44* (2014.11); *H04N 19/513* (2014.11)

(58) Field of Classification Search
USPC .................................................. 375/240.08
See application file for complete search history.

(56) References Cited

U.S. PATENT DOCUMENTS

| | | |
|---|---|---|
| 5,274,453 A | 12/1993 | Maeda |
| 5,469,226 A | 11/1995 | David et al. |
| 5,969,772 A | 10/1999 | Saeki |
| 6,404,813 B1 | 6/2002 | Haskell et al. |
| 6,614,847 B1 | 9/2003 | Das et al. |
| 7,756,348 B2 | 7/2010 | Mukherjee et al. |
| 8,358,691 B1* | 1/2013 | Wang ........................ G06T 7/20 375/240.02 |
| 8,675,736 B2 | 3/2014 | Huang et al. |
| 8,681,855 B2 | 3/2014 | Yin et al. |
| 9,986,236 B1 | 5/2018 | Mukherjee et al. |
| 2008/0304569 A1* | 12/2008 | Lee ...................... H04N 19/139 375/240.16 |
| 2009/0320081 A1 | 12/2009 | Chui et al. |
| 2010/0322315 A1 | 12/2010 | Hasuo |
| 2011/0109753 A1 | 5/2011 | Srinivasamurthy et al. |
| 2011/0134998 A1 | 6/2011 | Lee et al. |
| 2011/0200111 A1 | 8/2011 | Chen et al. |
| 2012/0147961 A1 | 6/2012 | Guo et al. |
| 2012/0300850 A1 | 11/2012 | Yie et al. |
| 2012/0307910 A1 | 12/2012 | Srinivasan et al. |
| 2013/0034166 A1 | 2/2013 | Shiodera et al. |
| 2013/0039423 A1 | 2/2013 | Helle et al. |
| 2013/0089265 A1 | 4/2013 | Yie et al. |
| 2013/0101039 A1 | 4/2013 | Florencio |
| 2013/0128979 A1 | 5/2013 | Jones et al. |
| 2013/0251039 A1 | 9/2013 | Drugeon et al. |
| 2013/0279591 A1 | 10/2013 | Ratner et al. |
| 2013/0287109 A1 | 10/2013 | Wang et al. |
| 2013/0287116 A1 | 10/2013 | Helle et al. |
| 2013/0329800 A1 | 12/2013 | Mironovich et al. |
| 2014/0226721 A1 | 8/2014 | Joshi et al. |
| 2015/0189272 A1 | 7/2015 | Peng et al. |
| 2016/0050411 A1 | 2/2016 | Wang |
| 2016/0080764 A1 | 3/2016 | Bae et al. |
| 2016/0182915 A1 | 6/2016 | Lee et al. |
| 2016/0269725 A1 | 9/2016 | Mrak et al. |
| 2017/0013279 A1 | 1/2017 | Puri et al. |
| 2017/0223357 A1 | 8/2017 | Bankoski et al. |
| 2017/0280144 A1 | 9/2017 | Dvir et al. |
| 2018/0176559 A1 | 6/2018 | Lee et al. |

FOREIGN PATENT DOCUMENTS

| | | |
|---|---|---|
| CN | 105 165 012 A | 12/2015 |
| EP | 2280550 A1 | 2/2011 |
| EP | 2597872 A2 | 5/2013 |
| GB | 2546886 A | 8/2017 |
| JP | S62-104283 A | 5/1987 |
| WO | 2012042654 A1 | 4/2012 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet—Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
VP6 Bitstream and Decoder Specification, Version 1.02, (On2 Technologies, Inc.), Dated Aug. 17, 2006.
VP6 Bitstream and Decoder Specification, Version 1.03, (On2 Technologies, Inc.), Dated Oct. 29, 2007.
"VP8 Data Format and Decoding Guide, WebM Project", Google On2, Dec. 1, 2010, 103 pp.
McCann et al, "Samsung's Response to the Call for Proposals on Video Compression Technology," Document JCTVC-A124, JCT-VC Meeting, Apr. 15-23, 2010 (Dresden, DE), 42 pp.
Cheng et al, "Merge Mode Based Fast Inter Prediction for HEVC," 2015 Visual Communication and Image Processing (VCIP), IEEE, Dec. 13, 2015, 4 pp.
Combined Search and Examination report in corresponding foreign Application No. GB1621550.1, dated May 22, 2017.
Combined Search and Examination Report in corresponding foreign Application No. GB1621923.0, dated May 31, 2017.
Ohm, Jens-Rainer. "Multimedia Signal Coding and Transmission." Springer 2015.
Examination report in corresponding CA Patent Application No. 3,001,888, dated Feb. 123, 2019, 7 pgs.
Park, Ju Hyun, et al., "The Shape-Based Motion Estimation Using Frame Differences for MCFI," Proceedings of 2009 International Conference on Computer Engineering & Systems, Dec. 16, 2009, pp. 397-402.
First Office Action in corresponding Chinese Patent Application for Invention No. 2016112346866, dated May 29, 2019, and its English translation, 30 pgs.
First Office Action in corresponding Japanese Patent Application for Invention No. 2018-519395, dated Jun. 25, 2019, and its English translation, 11 pgs.

(56) References Cited

OTHER PUBLICATIONS

Guilherme Correa et al; "Coding Tree Depth Estimation for Complexity Reduction of HEVC"; 2013 Data Compression Conference; IEEE; Mar. 2013; pp. 43-52.

* cited by examiner

LAST FRAME MOTION VECTOR PARTITIONING

CROSS-REFERENCE TO RELATED APPLICATION

This application is a continuation of U.S. patent application Ser. No. 15/011,415, filed Jan. 29, 2016, which is incorporated herein in its entirety by reference.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. In block-based codecs, this involves prediction techniques, including prediction using motion vectors.

SUMMARY

This disclosure relates in general to encoding and decoding visual data, such as video stream data, using last frame motion vector partitioning that allows the partitioning of the current frame to be based on the partitioning of a previous frame adjusted by one or more motion vectors. Broadly stated, a block is split into separate regions for prediction by shifting the prior frame partitions by one of the motion vectors covered by the new block's motion vector.

One aspect of a method for encoding or decoding a video signal herein includes determining a first partitioning of at least a portion of a frame before a current frame in a video sequence. The video signal includes a plurality of frames defining the video sequence, each frame is partitioned into at least one region, and each region has pixels. The method also includes modifying the first partitioning to a second partitioning using a motion vector that predicts at least one prediction sub-region of a first region from the first partitioning, and using the second partitioning to encode or decode a current region of the current frame.

One aspect of an apparatus described herein comprises a processor and a non-transitory memory that stores instructions causing the processor to perform a method including determining a first partitioning of at least a portion of a frame before a current frame in the video sequence, modifying the first partitioning to a second partitioning using a motion vector that predicts at least one prediction sub-region of a first region from the first partitioning, and using the second partitioning to encode or decode a current region of the current frame.

Another aspect of an apparatus herein is an apparatus for encoding a video signal, the video signal including frames defining a video sequence, each frame partitioned into blocks, and each block having pixels. The apparatus includes a processor and a non-transitory memory that stores instructions causing the processor to perform a method including determining a first partitioning of at least a portion of a frame before a current frame in the video sequence, modifying the first partitioning to a second partitioning by moving a location of boundaries of the first block within the frame by a motion vector that predicts a prediction sub-block of the first block to identify a new block and modifying the first partitioning encompassed within the boundaries of the new block at the location by a motion vector of a prediction sub-block of the frame at least partially overlaying the new block using a motion vector that predicts at least one prediction sub-block of the first block defined by the first partitioning, and using the second partitioning to encode a current block of the current frame, the current block collocated with the first block.

Another method for encoding or decoding a video signal using a computing device, where the video signal includes frames defining a video sequence, is described herein and includes determining, for a frame before a current frame in the video sequence, a first partitioning for partitioning a first region of the frame, the first partitioning defining at least two prediction sub-regions of the first region, the at least two prediction sub-regions of the first region comprising contiguous, non-overlapping groups of pixels, determining a motion vector that predicts a prediction sub-region of the first region, modifying the first partitioning to a second partitioning for partitioning a current region of the current frame by moving at least one border of the first partitioning that is between adjacent prediction sub-regions of the first region by the motion vector, wherein the current region is collocated with the first region, and encoding or decoding the current region of the current frame as partitioned by the second partitioning.

An apparatus for encoding or decoding a video signal including frames defining a video sequence described herein includes a processor configured to perform a method including determining, for a frame before a current frame in the video sequence, a first partitioning for partitioning a first region of the frame, the first partitioning defining at least two prediction sub-regions of the first region, determining a motion vector that predicts a prediction sub-region of the first region, modifying the first partitioning to a second partitioning for partitioning a current region of the current frame by moving at least one border of the first partitioning that is between adjacent prediction sub-regions of the first region by the motion vector, wherein the current region is collocated with the first region, and encoding or decoding the current region of the current frame as partitioned by the second partitioning.

An apparatus for decoding a video signal including frames defining a video sequence described herein includes a processor configured to receive, from an encoded bitstream, a first partitioning for partitioning a first block of a frame before a current frame in the video sequence, the first partitioning defining at least two prediction sub-regions of the first block, receive, from the encoded bitstream, a motion vector that predicts a prediction sub-region of the first block, modify the first partitioning to a second partitioning for partitioning a current block of the current frame by moving, with respect to the boundaries of the first block, at least one border of the first partitioning that is between adjacent prediction sub-regions of the first block by the motion vector, wherein the current block is collocated with the first block, and the second partitioning defines at least one prediction sub-region of the current block, and decode the current block using the second partitioning by, for each prediction sub-region of the current block, decoding, from the encoded bitstream, a prediction mode for the prediction sub-region of the current block, decoding, from the encoded bitstream, a residual sub-region associated with the prediction sub-region of the current block, generating, using the prediction mode, a predictor region for the prediction sub-region of the current block, and combining the residual sub-region with the predictor region to reconstruct the current block.

These and other aspects of this disclosure are described in additional detail in the following detailed description, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Inter-prediction, for example, uses a motion vector to identify a previously-encoded and decoded block that resembles a current block to be encoded. By encoding the motion vector, and the difference between the two blocks, a decoder can re-create the current block.

It is often desirable to encode as large a block as possible to minimize the amount of data included within headers of the bitstream that is used to decode the block. However, large blocks can result in a larger amount of distortion than is desirable, particularly where there is a lot of movement within the block. For this reason, and in order to better match objects within a block, larger blocks may be partitioned into several smaller blocks. For example, 16×16-pixel blocks or larger may be partitioned into blocks down to a size of 4×4 pixels for prediction. Partitioning of frames using other techniques, such as masks, wedges, etc., exhibits the same qualities. The description of partitioning with blocks herein is thus only one example of the output of frame partitioning.

Currently, each frame is partitioned from scratch—that is, without regard to the partitioning of a previous frame. In contrast, the teachings herein describe an option whereby the last frame's partitioning is shifted by motion vectors in the frame to generate a new partitioning rather than re-partitioning an entire frame each time. In general, blocks (or previous regions partitioned by a frame) are split into separate regions by shifting the prior frame partition(s), e.g., by one of the motion vectors covered by the new region's or block's motion vector. Each of the new regions can have its own motion vector, and this allows separate modes and motion vectors for non-square regions of a frame. By using a motion vector to change the prior frame's partitioning to make it valid for the new frame, prediction costs (including computation time) may be reduced. Further details are described after an initial discussion of the environment in which the teachings herein may be used.

Figure 1:
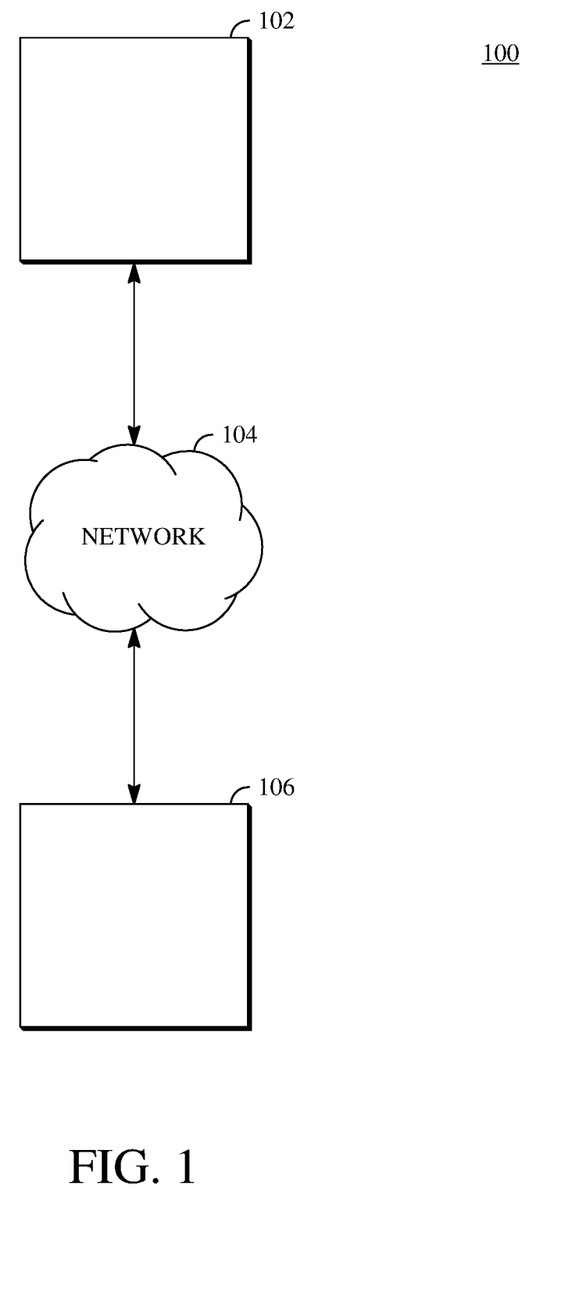
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
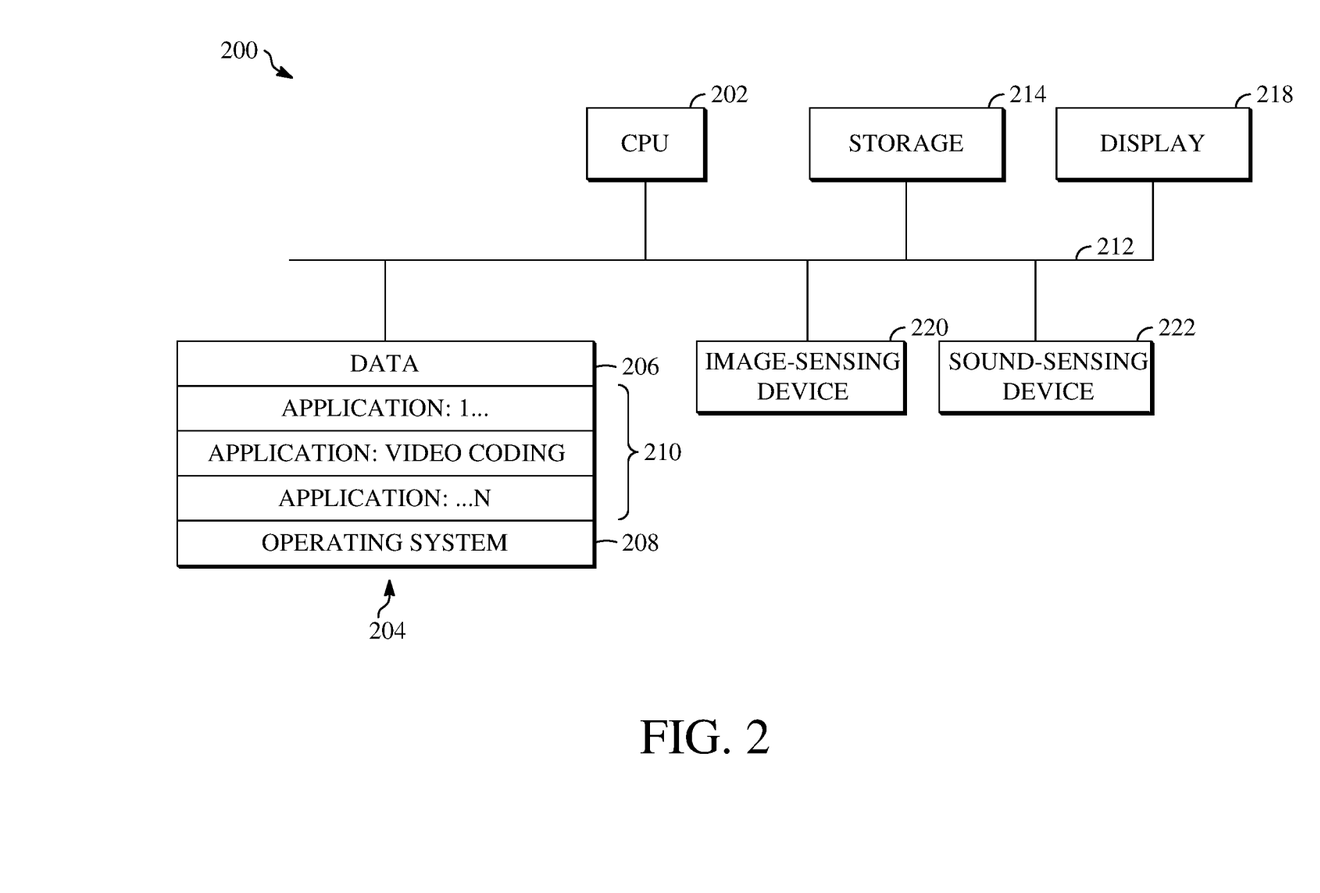
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
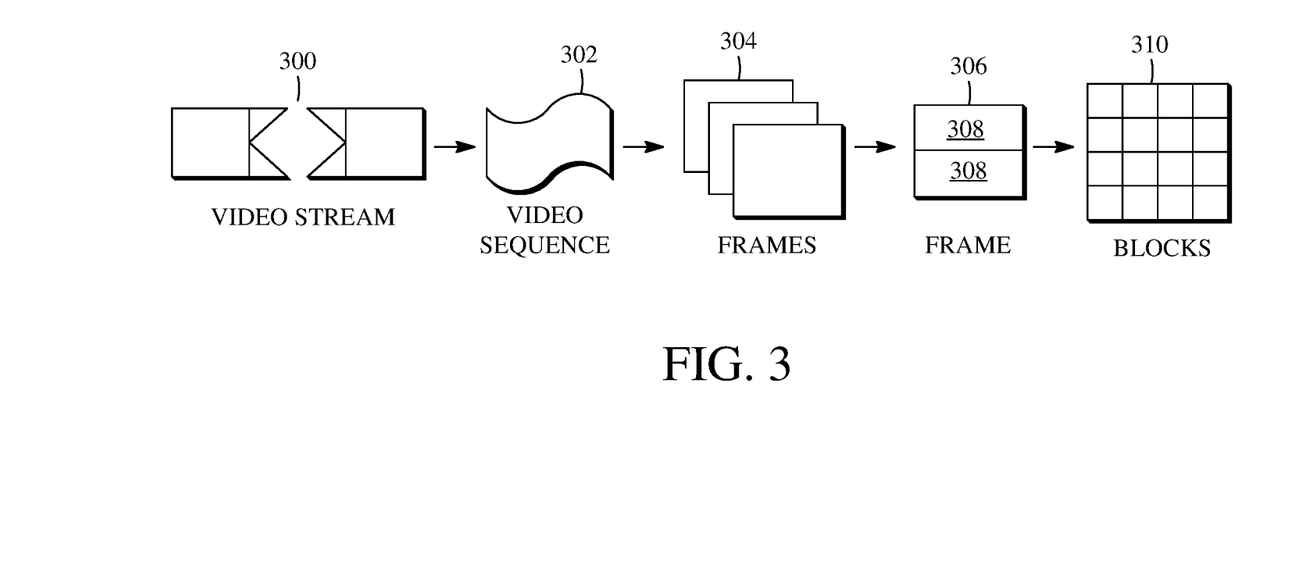
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more planes of pixel data. The blocks 310 can also be of any other suitable size such as 4×4 pixels, 8×8 pixels, 16×8 pixels, 8×16 pixels, 16×16 pixels, or larger. The blocks 310 or other regions resulting from partitioning of the frames 306 may be partitioned according to the teachings herein as discussed in more detail below. That is, the regions to be encoded may be larger regions partitioned into smaller sub-blocks or regions. More particularly, a current region to be encoded may be split into smaller groups of pixels that are encoded using, e.g., different prediction modes. These groups of pixels may be referred to herein as prediction sub-blocks, prediction sub-regions, or prediction units. In some cases, there is only one prediction sub-region that encompasses the entire region to be encoded as the region is encoded using only one prediction mode. Unless otherwise stated, the description of encoding and decoding a block in FIGS. 4 and 5 below applies equally to prediction sub-blocks, prediction sub-regions, or prediction units of a larger region.

Figure 4:
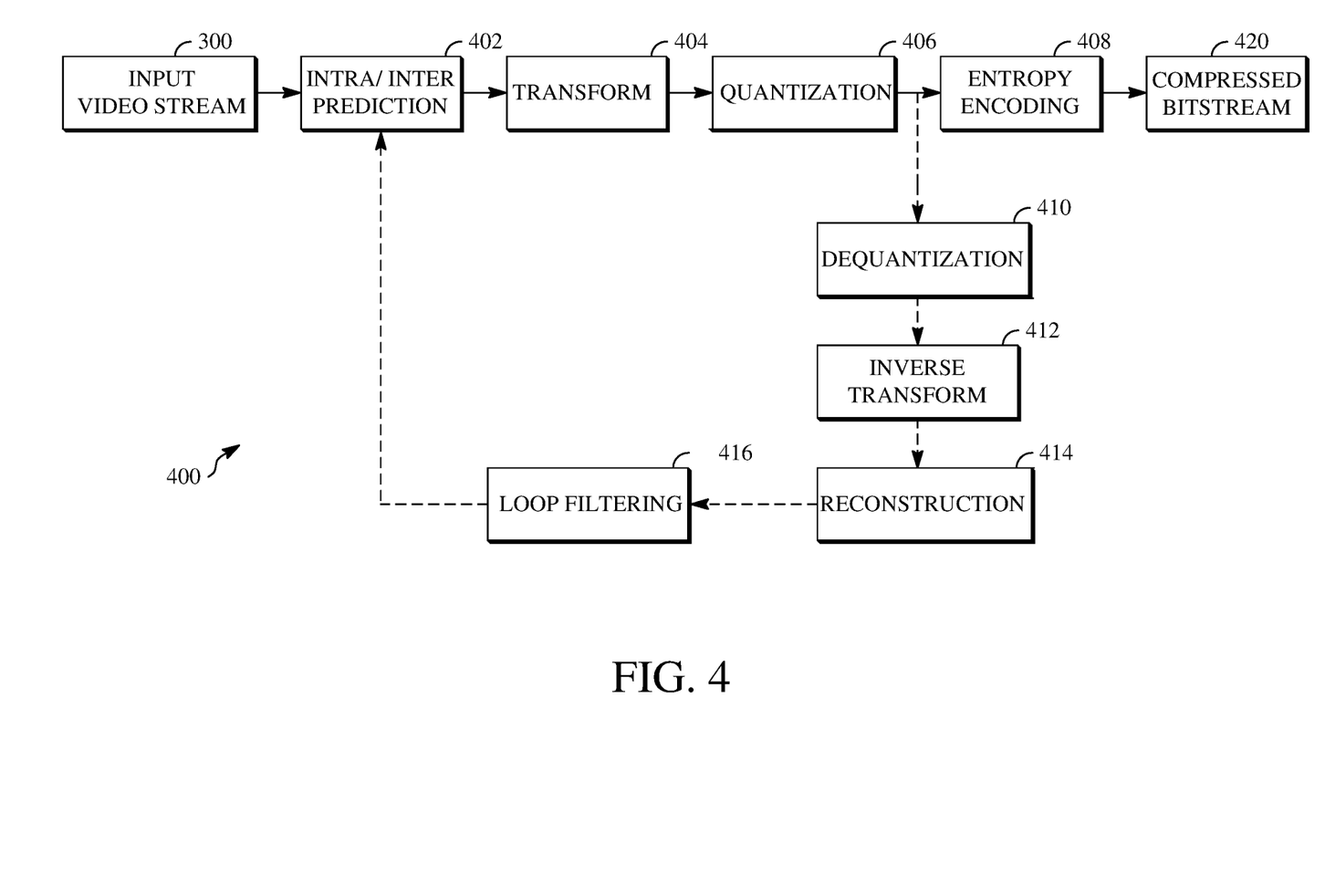
FIG. 4 is a block diagram of an encoder according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, a frame 306 can be processed in units of pixels (e.g., regions) such as blocks by example. At the intra/inter prediction stage 402, a block can be encoded using intra-frame prediction (also called intra prediction) or inter-frame prediction (also called inter prediction or inter-prediction herein). In any case, a prediction (or predictor) block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the residual block or region may be split into smaller blocks regions to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage. The encoder 400 can encode any size or shape groups of pixels according to this technique. The groups of pixels to be encoded may thus be more generally referred to as regions.

Figure 5:
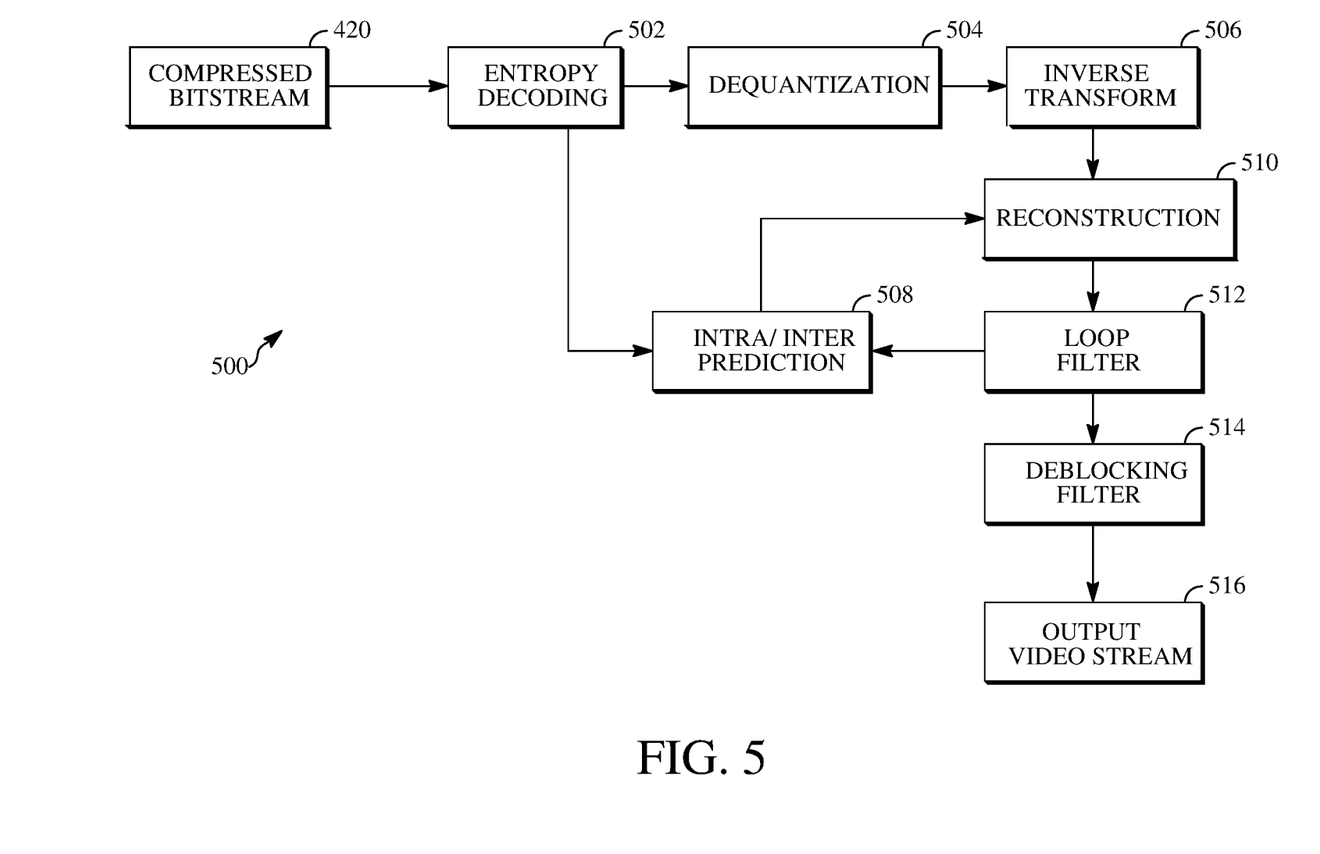
FIG. 5 is a block diagram of a decoder according to another aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. While described with reference to blocks for simplicity of explanation, the decoder 500 can decode any size or shape groups of pixels (e.g., regions) according to this technique.

As mentioned briefly above, a frame or region of a frame may be partitioned for encoding or decoding by last frame motion vector partitioning—that is, by adjusting the last frame's partitioning using a motion vector. In general, a region is split into separate regions by shifting the prior frame partitions by one of the motion vectors covered by the new region's motion vector.

Figure 6:
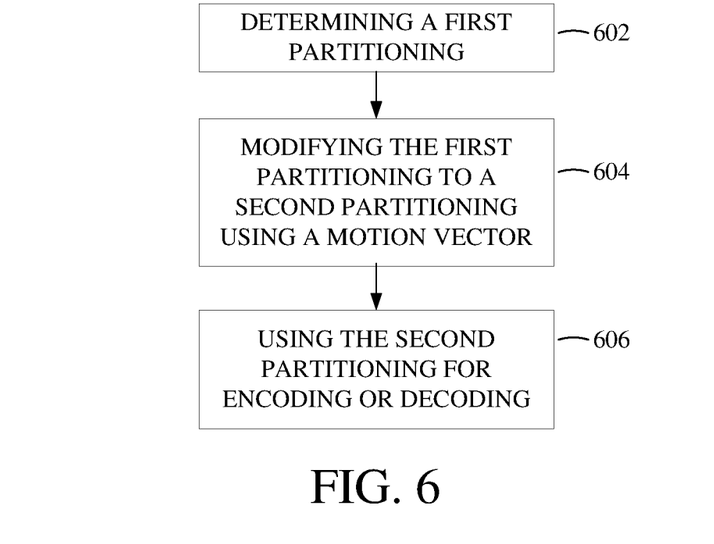
FIG. 6 is a flowchart diagram of a process for encoding or decoding a region using last frame motion vector partitioning.

FIG. 6 is a flowchart diagram of a process 600 for encoding or decoding a region by last frame motion vector partitioning according to one implementation of this disclosure. The method or process 600 can be implemented in a system such as the computing device 200 to aid the encoding or decoding of a video stream. The process 600 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 600. The process 600 can also be implemented using hardware in whole or in part. As explained above, some computing devices may have multiple memories and multiple processors, and the steps or operations of the process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, the process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. The process 600 may be repeated for each block of each frame of the input signal. In some implementations, only some blocks of one or more frames are processed according to the process 600. For example, blocks encoded using intra-prediction modes may be omitted when performing the process 600.

When the process 600 is an encoding process, the input signal can be, for example, the video stream 300. The input signal can be received by the computer performing the process 600 in any number of ways. For example, the input signal can be captured by the image-sensing device 220 or received from another device through an input connected to the bus 212. The input signal could be retrieved from the secondary storage 214 in another implementation. Other ways of receiving and other sources of the input signal are possible. For example, when the process 600 is a decoding process, the input signal can be an encoded bitstream such as the compressed bitstream 420.

Using the input signal, a first partitioning of a region is determined at 602. This can include determining a first partitioning of at least a portion of a frame before a current frame in a video sequence.

When the process 600 is an encoding process, determining the first partitioning may incorporate using rate-distortion calculations. For example, when the frame is the first frame in the video sequence, the first partitioning may be performed by dividing the frame into blocks and determining the best prediction mode for the blocks from among a plurality of available prediction modes as determined by, e.g., the lowest rate-distortion value according to the encoding process of FIG. 4. In one example, the block is a 16×16-pixel block, and the available prediction modes may include several intra-prediction and inter-prediction modes for the block and for sub-blocks of the block having sizes of 8×16 pixels, 16×8 pixels, 8×8 pixels, 8×4 pixels, 4×8 pixels, and 4×4 pixels. In another example, the frame is not the first frame in the video sequence. In such a case, the first partitioning may be determined as described herein based on the partitioning of a previous frame, e.g., the last frame in the video sequence before the frame.

When the process 600 is a decoding process, determining the first partitioning may include decoding the frame from an encoded video bitstream such as described with respect to FIG. 5. The decoded frame is decoded according to the partitioning determined by the encoder in one implementation.

Whether the process 600 is an encoding process or a decoding process, the first partitioning defines at least one prediction sub-region of a first region of the frame. The first partitioning is modified at 604 using a motion vector. In one implementation, modifying the first partitioning includes modifying the first partitioning to a second partitioning using a motion vector that predicts at least one prediction sub-region of a first region from the first partitioning. In some cases, this is achieved by moving the location of the first region within the frame by the motion vector and then modifying the first partitioning encompassed within the bounds of the new region position by at least one motion vector of a prediction sub-region at least partially overlaying the new region. In other cases, this is achieved by modifying the first partitioning encompassed within the bounds of the first region by the motion vector.

Figure 7A:
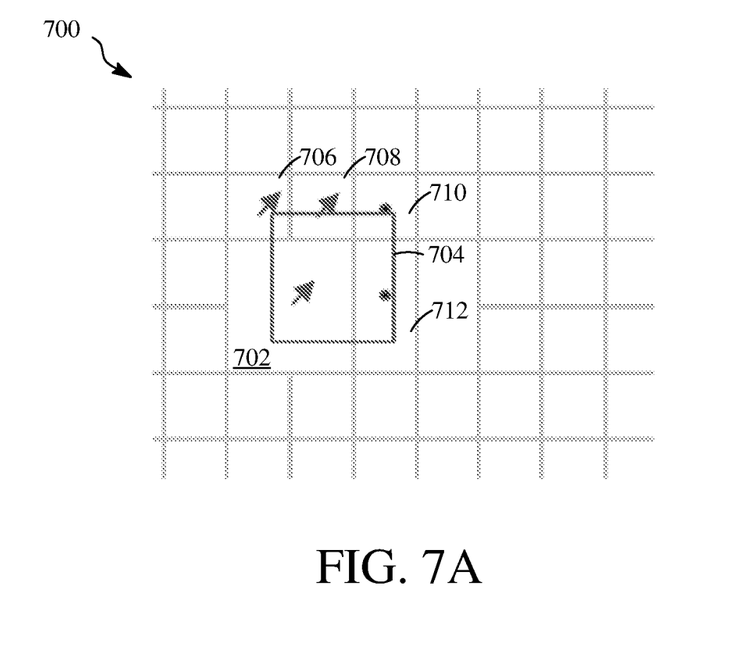
FIGS. 7A-7C are diagrams of one example used to explain the process of FIG. 6.
Figure 7B:
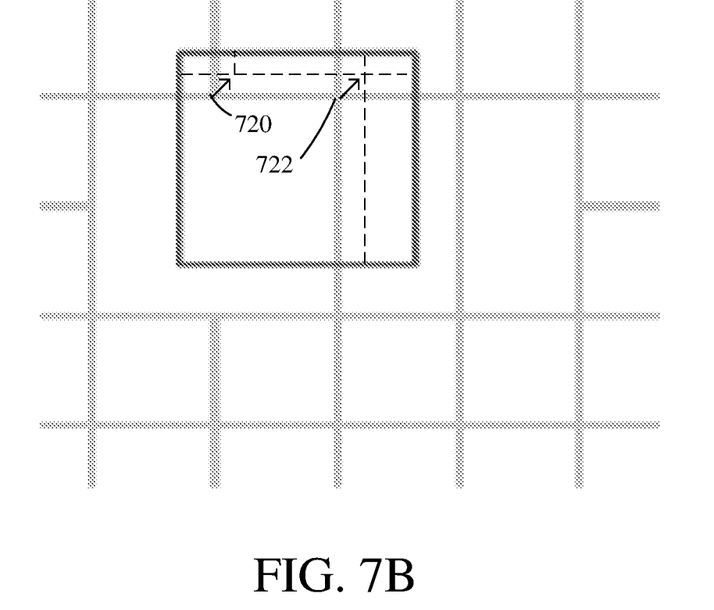
Figure 7C:
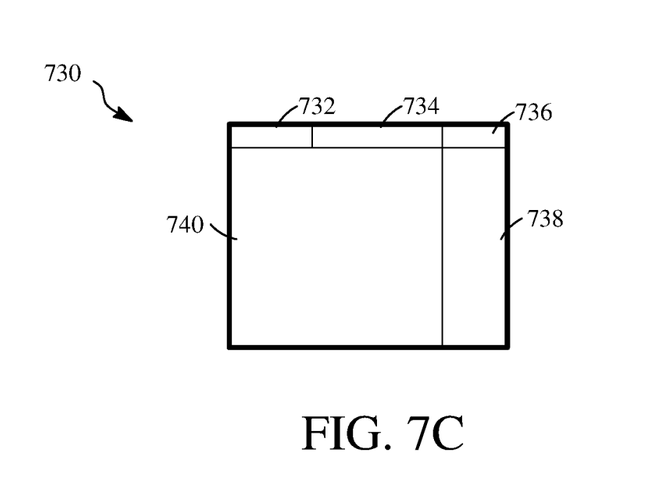

FIGS. 7A-7C are diagrams of one example used to explain the process 600 of FIG. 6. More specifically, FIGS. 7A-7C explain modifying the first partitioning at 604 of the process 600. This example shows partitioning that results in regions shaped as blocks, so the term block is used. However, the description of the process 600 with reference to FIGS. 7A-7C would apply to regions that may or may not have rectangular shapes.

FIG. 7A shows a portion of the first partitioning 700 of a frame before a current frame in the video sequence. In this example of block-based partitioning, the first block 702 is partitioned into only one prediction sub-block. That is, the first block 702 is predicted using a single motion vector represented by the arrow within the boundaries of the first block 702 in FIG. 7A. Several other prediction sub-blocks of the first partitioning 700 are shown in FIG. 7A. Specifically, prediction sub-blocks of three other blocks are labeled by example.

The block above the first block 702 is partitioned into four equally-sized prediction sub-blocks, two of which are labeled prediction sub-block 706 and prediction sub-block 708. The prediction sub-block 706 is predicted using a motion vector shown by the arrow within the boundaries of the prediction sub-block 706 in FIG. 7A, while the prediction sub-block 708 is predicted using a motion vector shown by the arrow within the boundaries of the prediction sub-block 708 in FIG. 7A. The motion vectors of the prediction sub-blocks 706, 708 are different, or the portion of the block they represent would be shown as a single sub-block. The remaining two sub-blocks of the block above the first block 702 are encoded using different prediction modes and/or different motion vectors.

The block to the right of the above block is also partitioned into four equally-sized prediction sub-blocks, one of which is labeled prediction sub-block 710. The prediction sub-block 710 is predicted using intra-prediction as shown by the dot within the boundaries of the prediction sub-block 710 in FIG. 7A. The remaining prediction sub-blocks of this block are not labeled in this example because they are not used here, but each may be encoded using different prediction modes and/or different motion vectors.

The block to the right of the first block 702 is partitioned into two equally-sized prediction sub-blocks, one of which is labeled prediction sub-block 712. The prediction sub-block 712 is predicted using intra-prediction as shown by the dot within the boundaries of the prediction sub-block 712 in FIG. 7A. The remaining prediction sub-block of this block is not labeled in this example because it is not used here, but it is encoded using a different prediction mode.

The first block 702 may be a 16×16-pixel block, a 32×32-pixel block, or some other size block. When the first block 702 is, for example, a 16×16-pixel block, the prediction sub-blocks 706, 708, 710 comprise 8×8 pixels each, and the prediction sub-block 712 is 8×16 pixels.

As mentioned above, the first partitioning may be modified to a second partitioning using a motion vector that predicts at least one prediction sub-region of a first region from the first partitioning. In the example of FIGS. 7A-7C, this is achieved by moving the location of the first region (here, a block) within the frame by the motion vector and then modifying the first partitioning encompassed within the bounds of the new position by at least one motion vector of a prediction sub-region at least partially overlaying the new position. As shown in FIG. 7A, the first block 702 is moved to the location indicated by the new block 704. The first partitioning encompassed within the bounds of the new block 704 includes portions of the first block 702, the prediction sub-blocks 706, 708, 710, and the prediction sub-block 712. The motion vectors of the prediction sub-blocks at least partially overlaying the new block 704 include the motion vectors for the first block 702 and the prediction sub-blocks 706, 708. FIG. 7B shows the modification of the first partitioning whereby borders defined by vertices 720, 722 between adjacent prediction blocks or sub-blocks within the boundaries of the new block 704 are adjusted by another motion vector. The motion vector used could be only one of the available motion vectors, such as the largest or smallest motion vector, or it could be a combination of the available motion vectors, such as an average or a weighted average. A weighted average may be based on the portion of the new block 704 (e.g., the number of pixels in the region as a whole) predicted using each of the motion vectors. FIG. 7C shows the resulting second partitioning 730 for the new block 704, which includes five prediction sub-blocks 732-740.

Stated more generally, FIGS. 7A-7C show a process whereby modifying the first partitioning includes adjusting outer boundaries of the first region to an updated position within the frame using the motion vector where the updated position overlay portions of regions of the frame (e.g., portions of prediction sub-regions). Then, corners or vertices (and with them borders) of the portions of the regions are moved within the updated position by the same motion vector (or a different motion vector) to modify the first partitioning to the second partitioning.

Figure 8A:
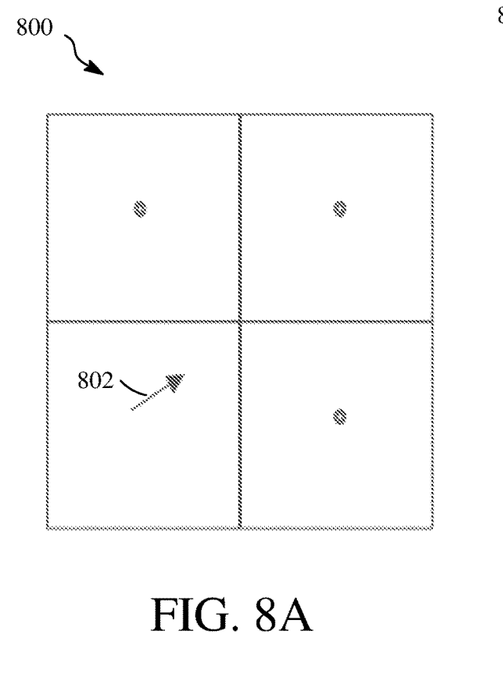
FIGS. 8A and 8B are diagrams of another example used to explain the process of FIG. 6.
Figure 8B:
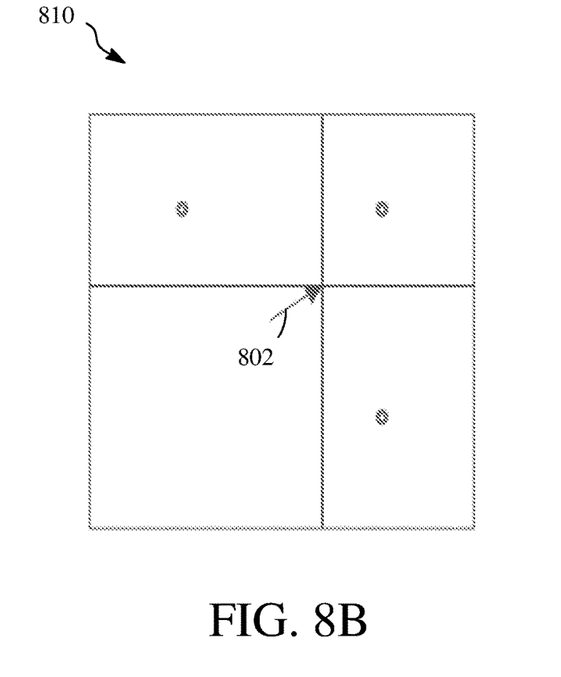

FIGS. 8A and 8B are diagrams of another example used to explain the process 600 of FIG. 6. In this case, modifying the first partitioning using a motion vector is achieved by modifying the first partitioning encompassed within the bounds of the first region by the motion vector. Because FIGS. 8A and 8B show partitioning into blocks, the regions are referred to as blocks. As shown in FIG. 8A, a block 800 is partitioned into four prediction sub-blocks, one of which is predicted using a motion vector 802, and the other three of which are intra-predicted. In this case, the modified, second partitioning is shown for a block 810 where, as in FIG. 7B, the intersection (corner or vertex) between the prediction sub-blocks is moved by the motion vector 802 to modify the first partitioning to the second partitioning.

The choice between motion vectors used to modify the partitioning may be determined heuristically based on, e.g., prediction modes or motion vector values, or experimentally by testing different techniques and selecting the one best suited for the block (and frame) being encoded. The technique used to modify the partitioning for each block of the frame processed according to FIG. 6 may be identified by a flag or other identifier within the bitstream such that the decoder generates the same partitioning of the subsequent frame. This could be sent in a frame header to the extent the same technique is used for the frame. Alternatively, or additionally, the motion vector used to modify the partitioning on a region or segment basis can be sent in a region (e.g., a block) or segment header for use by the decoder. In some implementations, only a mode identifier need be sent from the encoder to indicate that the partitioning of a region, segment or frame was performed using last frame motion vector partitioning in order for the decoder to be able to generate the new partitioning. In a variation of these implementations, the process 600 is performed only at the encoder, and the decoder may decode the partitioned regions located within the bitstream, e.g., according to FIG. 5.

Once the modified, second partitioning is determined, it is used to encode or decode a current region of the current frame at 606. The current region may be collocated with the first region. For example, the current region and the first region may be collocated blocks. Collocated regions have the same pixel coordinates within different frames. Alternatively, the current region may be shifted within the current frame from the first region position by a motion vector, such as the motion vector for the first block 702 in an example. Encoding the current region includes encoding the prediction sub-regions of the second partitioning by generating residuals for the prediction sub-regions of the current region, and encoding the residuals into an encoded bitstream with information necessary for decoding the current region. For example, the encoding process could include processing the residuals using the transform stage 404, the quantization stage 406, and the entropy encoding stage 408 as described with respect to FIG. 4. The residuals for each prediction sub-region may be generated using different prediction modes, determined through exhaustive testing of the available prediction modes for the best mode for each, or may be determined from a smaller list of prediction modes based on the previous prediction mode for the first region.

When the process 600 is a decoding process, the modified partitioning may be used to determine the size of the residuals for each prediction sub-region of the current region for decoding the residuals and then generate a similarly-sized prediction region for each to add to the residuals to reconstruct the current region. For example, the decoding process could include processing the residual using the entropy decoding stage 502, the dequantization stage 504, and the inverse transform stage 506 as described with respect to FIG. 5. Then, the current region could be reconstructed at reconstruction stage 510 as also described with respect to FIG. 5.

While the process 600 has been described with respect to certain examples with rectangular-shaped prediction sub-blocks formed using a block-based partitioning technique, the process 600 can be used with regions resulting from various partitioning techniques for a frame. The process 600 works well with masks, for example, by using the mask for the last frame shifted by a motion vector. With a mask having a border between two generally contiguous pixel areas that are separately predicted, the first partitioning would define two prediction sub-regions of first region, and the second partitioning would include two updated, prediction sub-regions wherein a border between the updated prediction sub-regions is a border between the original prediction sub-regions moved within the first region by a motion vector. That is, for example, a first partitioning may define two prediction sub-regions of a first region using a mask, where each of the two prediction sub-regions is on an opposing side of a border within the mask. Then, modifying the first partitioning includes moving the border within the mask by the motion vector to generate an updated border for prediction such that the second partitioning includes two updated prediction sub-regions on opposing sides of the updated border when the updated mask is used for prediction. Regions resulting from partitioning techniques using, for example, wedge, color, residual, and three motion vector mode masks, could all benefit from last frame motion vector partitioning according to the process 600.

By using a motion vector to change a prior frame's partitioning to make it valid for the new frame, the computation involved with partitioning when encoding a new frame can be minimized. The teachings herein provide an option to avoid re-partitioning the entire frame while with the flexibility of allowing the newly-defined regions of the frame to have their own motion vectors and/or coding mode and allow separate modes and motion vectors for non-square blocks of pixels. This aids in providing good prediction for compression.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding or decoding a video signal using a computing device, the video signal including frames defining a video sequence, the method comprising:
    determining, for a frame before a current frame in the video sequence, a first partitioning for partitioning a first region of the frame, the first partitioning defining at least two prediction sub-regions of the first region, the at least two prediction sub-regions of the first region comprising contiguous, non-overlapping groups of pixels;
    determining a motion vector that predicts a prediction sub-region of the first region;
    modifying the first partitioning to a second partitioning for partitioning a current region of the current frame by moving at least one border of the first partitioning that is between adjacent prediction sub-regions of the first region by the motion vector such that the first partitioning of the first region is different from the second partitioning of the current region, wherein the current region is collocated with the first region; and
    encoding or decoding the current region of the current frame as partitioned by the second partitioning.

2. The method of claim 1, wherein the current region of the current frame and the first region of the frame before the current frame are collocated blocks.

3. The method of claim 1, wherein the first partitioning defines a first prediction sub-region and a second prediction sub-region of the first region, and wherein:
    the second partitioning defines a first prediction sub-region and a second prediction sub-region of the current region, wherein, as a result of moving the at least one border, the first prediction sub-region of the first region is smaller than the first prediction sub-region of the current region, and the second prediction sub-region of the first region is larger than the second prediction sub-region of the current region.

4. The method of claim 3, wherein the motion vector is a motion vector of only one of the first prediction sub-region or the second prediction sub-region of the first region.

5. The method of claim 3, wherein the motion vector is an average motion vector combining a motion vector of each of the first prediction sub-region and the second prediction sub-region of the first region.

6. The method of claim 1, wherein the frame is divided into a plurality of blocks, at least some of the blocks are partitioned into sub-blocks, the first region is a first block, the current region is a current block, and the at least two prediction sub-regions for the first region comprise sub-blocks of the first block.

7. The method of claim 1, wherein the second partitioning defines at least one prediction sub-region for the current region that is different in dimensions from the at least two prediction sub-regions defined by the first partitioning.

8. The method of claim 1, wherein the motion vector is a motion vector of only one of the at least two prediction sub-regions of the first region.

9. The method of claim 1, wherein the motion vector is a combination of motion vectors of the at least two prediction sub-regions of the first region.

10. The method of claim 1, wherein moving at least one border of the first partitioning that is between adjacent prediction sub-regions of the first region by the motion vector comprises moving at least two borders of the first partitioning by the motion vector.

11. The method of claim 1, wherein encoding the current region comprises, for each prediction sub-region of the current region according to the second partitioning:
    generating a predictor region for the prediction sub-region;
    calculating a residual region using the predictor region; and
    encoding the residual region within an encoded bitstream.

12. The method of claim 1, further comprising:
    signaling, within an encoded bitstream, the motion vector used to modify the first partitioning to a decoder from an encoder.

13. An apparatus for encoding or decoding a video signal including frames defining a video sequence, the apparatus comprising:
    a processor configured to perform a method comprising:
        determining, for a frame before a current frame in the video sequence, a first partitioning for partitioning a first region of the frame, the first partitioning defining at least two prediction sub-regions of the first region;
        determining a motion vector that predicts a prediction sub-region of the first region;
        modifying the first partitioning to a second partitioning for partitioning a current region of the current frame by moving at least one border of the first partitioning that is between adjacent prediction sub-regions of the first region by the motion vector, wherein the current region is collocated with the first region; and
        encoding or decoding the current region of the current frame as partitioned by the second partitioning.

14. The apparatus of claim 13, wherein the first partitioning is a mask that defines only two prediction sub-regions of the first region on opposing sides of the border.

15. The apparatus of claim 13, wherein modifying the first partitioning to the second partitioning comprises:
    moving a location of boundaries identifying the first region within the frame by the motion vector to identify a new region; and
    modifying the first partitioning encompassed within the boundaries of the new region at the location by at least one motion vector of a prediction sub-region at least partially overlaying the new region.

16. The apparatus of claim 15, wherein the at least one motion vector of the prediction sub-region at least partially overlaying the new region is the motion vector that predicts a prediction sub-region of the first region.

17. The apparatus of claim 15, wherein the at least one motion vector of the prediction sub-region at least partially overlaying the new region is a combination of respective motion vectors of at least two prediction sub-regions at least partially overlaying the new region.

18. The apparatus of claim 13, wherein the processor is configured for decoding the current region by, for each prediction sub-region of the current region according to the second partitioning:
    decoding a residual sub-region associated with the prediction sub-region of the current region;
    generating a predictor region for the prediction sub-region; and
    combining the residual sub-region with the predictor region.

19. The apparatus of claim 13, wherein the motion vector is a combination of respective motion vectors of at least two prediction sub-regions of the first region.

20. An apparatus for decoding a video signal, the video signal including frames defining a video sequence; the apparatus comprising:

a processor configured to:

receive, from an encoded bitstream, a first partitioning for partitioning a first block of a frame before a current frame in the video sequence, the first partitioning defining at least two prediction sub-regions of the first block;

receive, from the encoded bitstream, a motion vector that predicts a prediction sub-region of the first block;

generate a second partitioning for partitioning a current block of the current frame that is different from the first partitioning by moving, with respect to outer boundaries of the first block, at least one border of the first partitioning that is between adjacent prediction sub-regions of the first block by the motion vector, wherein the current block is collocated with the first block, and the second partitioning defines at least one prediction sub-region of the current block; and decode the current block using the second partitioning by, for each prediction sub-region of the current block:

decoding, from the encoded bitstream, a prediction mode for the prediction sub-region of the current block;

decoding, from the encoded bitstream, a residual sub-region associated with the prediction sub-region of the current block;

generating, using the prediction mode, a predictor region for the prediction sub-region of the current block; and combining the residual sub-region with the predictor region to reconstruct the current block.

* * * * *